United States Patent [19]

Adams

[11] Patent Number: 4,726,135

[45] Date of Patent: Feb. 23, 1988

[54] APPARATUS AND METHOD FOR QUANTITATIVE DETERMINATION OF CHAMBER PRESSURE IN FIREARMS

[76] Inventor: D. Scott Adams, Rte. 2, Box 362, Pullman, Wash. 99163

[21] Appl. No.: 889,371

[22] Filed: Jul. 25, 1986

[51] Int. Cl.⁴ .......................... G01L 5/14; F42B 35/00
[52] U.S. Cl. .......................................... 42/1.01; 73/167
[58] Field of Search ................... 42/1.01, 1.06; 73/167

[56] References Cited

U.S. PATENT DOCUMENTS

| | | | |
|---|---|---|---|
| 2,362,484 | 11/1944 | Hickman | 73/167 |
| 3,178,935 | 4/1965 | McRitchie | 73/167 |
| 3,443,430 | 5/1969 | York et al. | 73/167 |
| 3,568,600 | 3/1971 | Nosler | 73/167 |

*Primary Examiner*—Deborah L. Kyle
*Assistant Examiner*—Michael J. Carone

[57] ABSTRACT

An apparatus and method is described which enables one to determine the amount of chamber pressure produced by a cartridge in any firearm chambered for said cartridge. A plastic material of uniform size, consistency, and shape is attached to the outside of the cartridge case with translucent adhesive tape - the total thickness of the plastic material and tape being such that chambering of the cartridge is not significantly inhibited. During firing the pressure inside the cartridge case causes the plastic material to spread between the cartridge case and the tape as both are forced against the rigid surface of the chamber wall. The width of the plastic material is measured and is proportional to the amount of pressure generated during firing of the cartridge. The actual pressure in pounds per square inch is determined from a standard curve that relates the width of the plastic material to pounds per square inch.

5 Claims, 6 Drawing Figures

APPARATUS AND METHOD FOR QUANTITATIVE DETERMINATION OF CHAMBER PRESSURE IN FIREARMS

BACKGROUND OF THE INVENTION

This invention relates to a simple apparatus and method for determining the chamber pressure in a firearm. This apparatus and method may be used with any firearm and requires no physical modification of the firearm or cartridge.

It is well known by those who load ammunition that chamber pressures produced by a given combination of cartridge components will differ depending on what firearm the cartridge is fired in. This may be due, for instance, to differences in the size of the chamber, length of the chamber throat and/or barrel dimensions. Furthermore, particularly among those who handload ammunition, it is well known that any change in amount of powder, weight of bullet, lot of primers and/or even the manufacture of cartridge case effect changes in chamber pressure.

Because the pressures produced by a particular load (combination of components) may be dangerous or result in suboptimal performance of a firearm, it is important to have a convenient and inexpensive method of determining the pressure of a particular loading in a given firearm.

One object of this invention is to provide the handloader with an apparatus and method for determining chamber pressure without altering or damaging the firearm or cartridge to be tested.

Another abject of this invention is to provide a simple, efficient and inexpensive means of determining the pressure of a given load without puncturing or otherwise physically altering the cartridge case.

Another objective of the invention is to provide the user with a plastic substance separate from the cartridge case wall and of predetermined size, shape and performance characteristics which make it amenable to the purpose of changing shape under the pressures developed inside chambers of firearms.

Furthermore, an object of this invention is to provide an optimal means of attaching the plastic substance to the cartridge case such that it will remain in place after firing, insure uniform spread of the plastic substance and facilitate measurement of the plastic substance.

Another object of this invention is to provide the user with data and a standard curve relating the width of the plastic substance to pounds per square inch from which the pressure in pounds per square inch can be determined.

These and other objects and advantages will become apparent upon reading the following brief description and studying the accompanying drawings.

BRIEF DESCRIPTION OF THE DRAWINGS

A preferred embodiment of this invention is illustrated in the accompanying drawings, in which.

DETAILED DESCRIPTION OF THE PREFERRED EMBODIMENT

Figure 1:
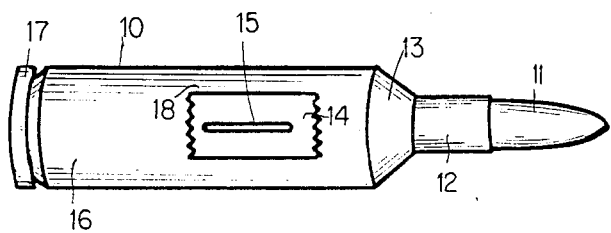
FIG. 1 is a plane view of a test cartridge showing the principle features of this invention including the plastic material held in place on the cartridge case body wall by translucent adhesive tape.

Referring to FIG. 1 a test cartridge 10 is shown that has a forward neck section 12 with a bullet 11 in place, a flared shoulder section 13, a tubular case body wall 16 and the enclosed base section and rim 17 that contains the primer.

The test cartridge has the pressure indicating apparatus 18 in place which consists of a plastic material 15 attached to the surface of the case body wall with translucent adhesive tape 14.

The test cartridge is assembled by first resizing the cartridge case to minimum dimensions with a resizing die, placing a primer in the primer pocket located at the base of the case, inserting an appropriate amount of propellent into the case and seating a bullet of the correct size and weight into the case neck. The surface of the cartridge is then cleaned to remove traces of dirt or lubricants that might cause inconsistent adhesion of the translucent tape or flow of the plastic material during detonation of the cartridge.

Figure 2:
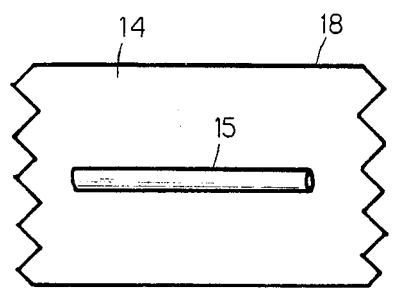
FIG. 2 is a plane view of the rod-shaped plastic material attached to the adhesive translucent tape comprising the pressure testing apparatus.
Figure 3:
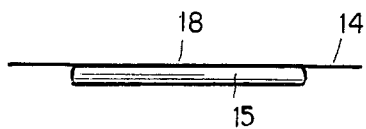
FIG. 3 is a side elevated view of the translucent tape with the plastic material attached to the adhesive side.

In FIGS. 2 and 3 the plastic material 15 is seen having a cylindrical or rod shape and attached to the translucent adhesive tape 14. The plastic material may be made of any number of substances, natural and synthetic, that is soft enough to deform without damaging the firearm chamber or cartridge case wall and hard enough so that it does not become too thin to measure. It should also maintain its degree of deformation after detonation so that an accurate measurement can be obtained.

The material known as Plastigage made by the Michigan Engine Bearing Company as well as other materials have been found to be suitable for this purpose. The material may also be of any shape and attached to the case wall in any orientation or location as long as the cartridge can be chambered in its intended firearm. A rod shape attached in a longitudinal orientation to the case wall is shown in the present embodiment.

The plastic material could be attached to the cartridge case wall by several means including glue, lubricants, natural adherence of the plastic material used or as is shown in the present embodiment by use of adhesive tape. The tape giving the most consistent results is removable Scotch Magic Mending Tape made by the 3M Company. The type of adhesive used on this tape allows freer flow of the plastic material between the case cartridge wall and the tape than other types of adhesives yet tried. Certain lubricants may also promote free flow of the plastic material. This free flow of the plastic material naturally leads to consistent results and ease of measurement.

Figure 4:
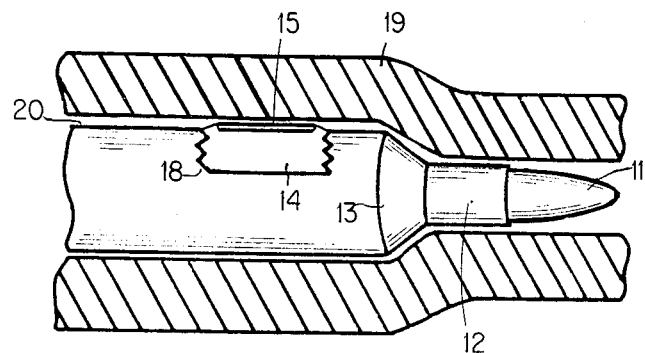
FIG. 4 is a schematic cross-section of a firearm chamber with the assembled test cartridge in place prior to detonation.

After assembly of the cartridge and attachment of the pressure indicating apparatus, the cartridge is placed in the firearm chamber 19 as shown in FIG. 4 with the pressure indicating apparatus placed in an upward position. It may be noted that there is a small amount of space 20 between the cartridge case and the chamber.

No firearm has yet been found that does not have sufficient space to accommodate the pressure indicating device in its present embodiment. The test cartridge is detonated by pulling the trigger which allows the firing pin to strike the primer igniting the propellent and forcing the bullet out the barrel by an abrupt increase in pressure. This pressure also forces the deformable cartridge case to take the shape of the chamber and at the same time causes deformation of the plastic material which is proportional to the amount of pressure inside the cartridge and chamber.

Figure 5:
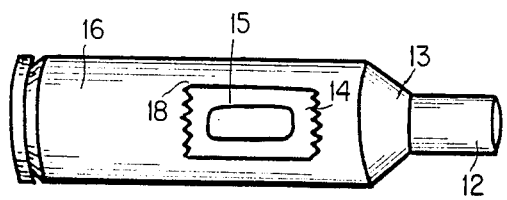
FIG. 5 is a plane view of the test cartridge after detonation emphasizing the increase in width of the plastic material beneath the translucent adhesive tape.

FIG. 5 shows the test cartridge after firing and, in particular, the deformed plastic material 15 under the adhesive tape 14. Measurements may be taken with calipers capable of measuring 0.001 of an inch or 0.1 millimeter. The easiest method of doing so employs the use of a magnifying comparator, a device that magnifies the image to be measured, thus increasing accuracy of the measurement.

Figure 6:
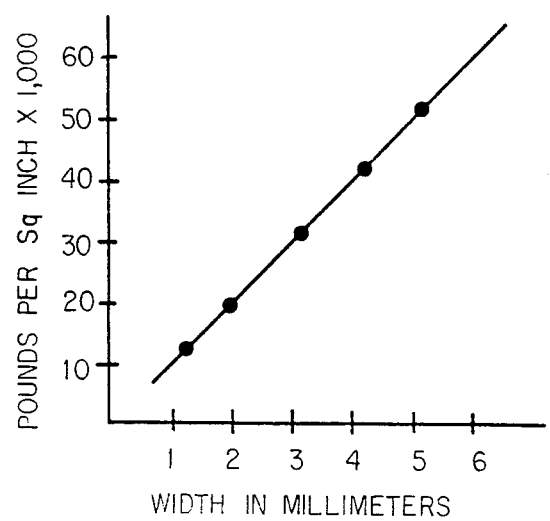
FIG. 6 is a view of a graph showing the chamber pressure versus width of the plastic material.

FIG. 6 depicts a theoretical graph of the expected amount of deformation in millimeters of width relative to the amount of pressure in pounds per square inch. This relationship will be different with changes in any number of variables, most notable any changes in the characteristics of the pressure measuring apparatus, for example, the type of plastic material or the adhesive material. Using published values of pressures to calibrate the graph, the experimental relationship is very near to what is shown in FIG. 6.

What I claim is:

1. A pressure testing apparatus designed to attach to the external surface of a firearm cartridge case to determine the amount of pressure produced by said cartridge, said pressure testing apparatus comprising:
    (a) a plastic material attached to the exterior of a cartridge case and which is deformed by pressure formed within the cartridge case during detonation while in the chamber of a firearm and;
    (b) an adhesive portion which insures that said plastic material will remain on the exterior surface of the cartridge case when it is removed from the chamber of said fire arm.

2. A pressure testing apparatus as recited in claim 1, wherein said plastic material has a thickness equal to or less than the clearance defined by the cartridge case and firearm cartridge chamber.

3. A pressure testing apparatus recited in claim 1, in which the adhesive material is selected from the group consisting of: adhesive tape, glue, lubricant or natural adherence of the plastic material used.

4. A pressure testing apparatus recited in claim 1, wherein the adhesive is applied over or beneath the plastic material.

5. A method of measuring chamber pressure in a fire arm comprising the steps of:
    (a) Placing a pressure testing apparatus on the outside of a cartridge case so that it can be placed in a firearm chamber;
    (b) Deforming a plastic material of said pressure testing apparatus by detonating the firearm cartridge;
    (c) Measuring dimension(s) or change in dimensions of said plastic material; and
    (d) Determining the chamber pressure by using a standard curve which relates changes in dimension(s) of the plastic material to chamber pressure.

* * * * *